Figure 1:
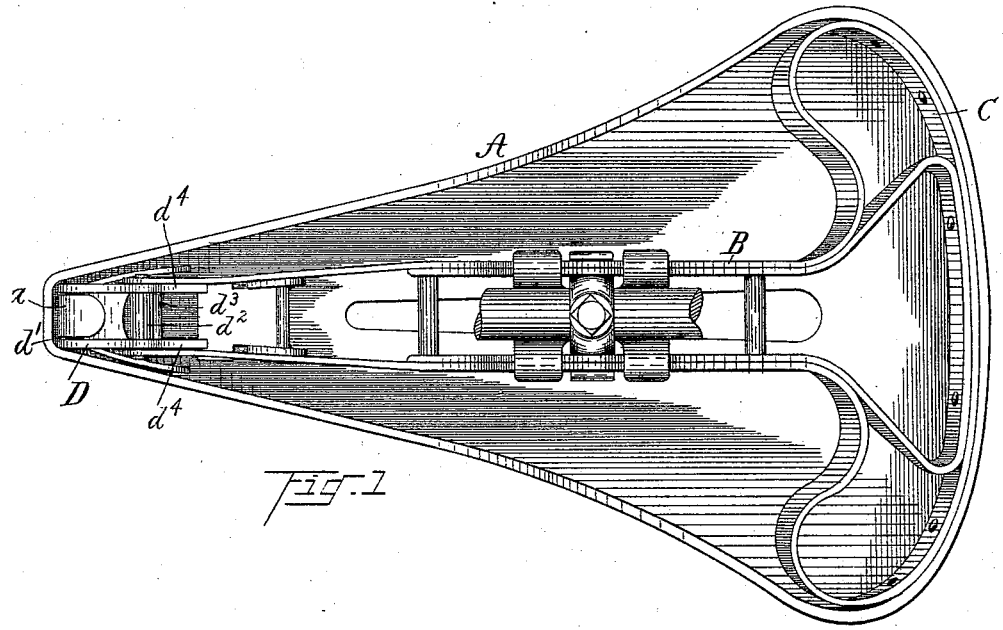

(No Model.)

A. L. GARFORD.
BICYCLE SADDLE.

No. 540,431.               Patented June 4, 1895.

WITNESSES.
L. Griswold
Helen M. Wood.

INVENTOR.
Arthur L. Garford
By Wing & Thurston
his attys

UNITED STATES PATENT OFFICE.

ARTHUR L. GARFORD, OF ELYRIA, OHIO.

BICYCLE-SADDLE.

SPECIFICATION forming part of Letters Patent No. 540,431, dated June 4, 1895.

Application filed July 30, 1894. Serial No. 518,994. (No model.)

*To all whom it may concern:*

Be it known that I, ARTHUR L. GARFORD, a citizen of the United States, residing at Elyria, in the county of Lorain and State of Ohio, have invented certain new and useful Improvements in Bicycle-Saddles; and I do hereby declare the following to be a full, clear, and exact description of the invention, such as will enable others skilled in the art to which it appertains to make and use the same.

My invention relates to bicycle saddles and particularly to the means for connecting one end of the seat to the seat support, whereby such connection may be quickly made or broken and the tension upon the seat varied at will.

The invention consists in the construction and combination of parts shown in the drawings and hereinafter described and pointed out definitely in the claims.

Figure 2:
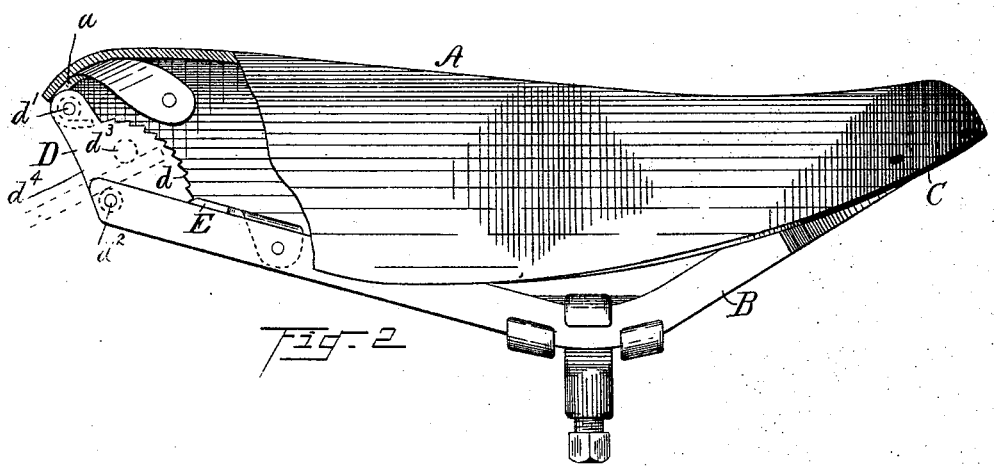
Figure 3:
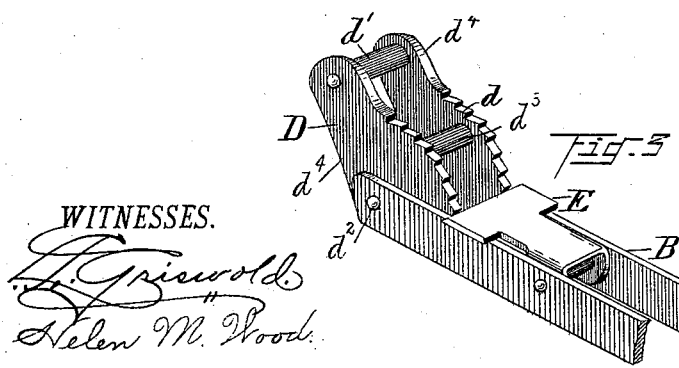

In the drawings, Figure 1 is a bottom view of my improved saddle. Fig. 2 is a side elevation with the front part of the seat broken away, and Fig. 3 is a perspective view of the front end of the seat-support and the mechanism by means of which an adjustable connection may be made with the seat.

Referring to the parts by letters, A represents the seat, which is commonly made of leather.

B represents the seat support, which may be made of any suitable construction.

One end of the seat, preferably the rear end, is secured to the corresponding end of the seat support, usually by means of a cantle which is secured to both the seat and seat support. In the saddle shown in the drawings the cantle C is an integral part of the seat support; but the specific construction of the seat support and the means for connecting one end thereof with the corresponding end of the seat is a detail which has nothing to do with the present invention.

To the other end (in this case, the front end) of the seat support a link D is pivoted, and it projects upward and forward from its pivot to its connection with the seat. The connection between the link and seat is likewise a pivotal connection, and is preferably made by means of a hook, $a$, which is secured to the seat and embraces a horizontal cylindrical pin $d'$ which is secured to the link. It is evident that by swinging the link forward, the tension on the seat will be increased. Means are provided for holding said link in any desired position relative to the seat support, and thereby preserving the desired tension on the seat. The specific construction of the instrumentalities by which this result is secured is as follows: The said link is formed with a ratchet segment $d$ on its rear side. A pawl E is pivoted to the seat support and is adapted to engage with said ratchet. The pawl engages with the top side of said seat support and its movement in one direction is limited by said engagement.

The link is preferably made of two like parts $d^4$ $d^4$ which are held in the desired relation to each other by the pin $d'$, the pivot $d^2$ and the intermediate cross bar or pin $d^3$. The pin $d^3$ is useful for another purpose, viz: It affords a purchase for a rod G, (shown in dotted lines in Fig. 2) which may be introduced between said pin and the pivot pin, whereby the link may be swung forward to tighten the seat, or to permit the disengagement of the pawl from the ratchet teeth.

Having described my invention, I claim—

1. In a bicycle saddle, the combination of a seat support and a seat secured at one end to one end of said seat support, with a link pivotally connected with the other ends of said seat and seat support respectively, which link has a ratchet segment on its rear edge, and a pawl pivoted to and extending over the seat support and adapted to engage with said ratchet segment, substantially as and for the purpose specified.

2. In a bicycle saddle, the combination of the seat support, and a seat secured at one end to said seat support, with a hook secured at the other end of said seat, a two-part link pivoted to said seat support having a pin at its upper end adapted to be engaged by said hook, a bar $d^3$ on said link intermediate of said pin and the pivot, a ratchet on said link, and a pawl pivoted to said seat support, substantially as and for the purpose specified.

In testimony whereof I affix my signature in presence of two witnesses.

ARTHUR L. GARFORD.

Witnesses:
E. L. THURSTON,
HELEN M. WOOD.